United States Patent [19]

Dardis

[11] Patent Number: 4,509,597
[45] Date of Patent: Apr. 9, 1985

[54] SODA-ANTHRAQUINONE LIGNIN SACRIFICIAL AGENTS IN OIL RECOVERY

[75] Inventor: Richard E. Dardis, Brevard, N.C.

[73] Assignee: Olin Corporation, Pisgah Forest, N.C.

[21] Appl. No.: 606,636

[22] Filed: May 3, 1984

[51] Int. Cl.³ .............................................. E21B 43/22
[52] U.S. Cl. .................................... 166/274; 166/273; 166/275; 252/8.55 D
[58] Field of Search ...................... 166/273, 274, 275; 252/8.55 D

[56] References Cited

U.S. PATENT DOCUMENTS

| 3,468,377 | 9/1969 | Dunlap et al. | 166/274 |
| 3,476,188 | 11/1969 | Harvey | 166/275 X |
| 3,553,130 | 1/1971 | Stratton | 252/8.55 D |
| 3,964,548 | 6/1976 | Schoeder, Jr. et al. | 166/273 |
| 4,006,779 | 2/1977 | Kalfoglou | 166/275 |
| 4,008,768 | 2/1977 | Birk | 166/274 |
| 4,008,769 | 2/1977 | Chang | 166/274 |
| 4,273,191 | 6/1981 | Hradel | 166/275 X |
| 4,313,500 | 2/1982 | Johnson, Jr. et al. | 166/273 |

OTHER PUBLICATIONS

Gale et al., Soc. Pet. Eng., vol. 13, No. 4, p. 191 (1973).
Bozena Kosikova et al., Paperi Ja Pun, vol. 62 (4a), pp. 229-236 (1980).
Irwin A. Pearl, The Chemistry of Lignin, Mariel Dekker, Inc., N.Y., N.Y., pp. 19-22 (1967).
Fredrich Emil Brauns, The Chemistry of Lignin, Academic Press, Inc., N.Y., N.Y., pp. 99 and 416 (1952).

Primary Examiner—George A. Suchfield
Attorney, Agent, or Firm—Kerkam, Stowell, Kondracki & Clarke

[57] ABSTRACT

A supplemental oil recovery method comprising injecting into a subterranean formation a fluid containing soda-anthraquinone lignin which is adsorbed by adsorptive sites therein and functions as a sacrificial agent and thereafter injecting a micellar dispersion containing a surfactant into the subterranean formation to displace the oil contained therein.

4 Claims, No Drawings

SODA-ANTHRAQUINONE LIGNIN SACRIFICIAL AGENTS IN OIL RECOVERY

BACKGROUND OF THE INVENTION

1. Field of the Invention

This invention relates to the recovery of oil from subterranean formations.

2. Description of the Prior Art

Primary oil recovery methods rely on the natural energy present in oil reservoirs which forces the free oil up through wells drilled therein to the surface. After dissipation of the natural energy of the reservoir, however, there are often large amounts of oil remaining. It is common practice to utilize supplemental recovery techniques to recover the oil remaining in the reservoir. These supplemental recovery techniques are termed secondary, tertiary, etc., recovery operations depending upon their place in the series of operations carried out in the reservoir.

A commonly employed supplemental recovery operation, because of its simplicity and low cost, is water-flooding wherein a liquid, usually aqueous, is injected into the oil bearing formation through one or more injection wells drilled therein. The injected liquid forces the oil through the formation to a production well. Because oil and water are highly immiscible and due to the fact that there is high interfacial tension between aqueous liquid and oil, flooding with substantially pure water is not highly efficient. Inasmuch as secondary water-flooding recovery techniques leave a significant proportion of the oil remaining in the formation, tertiary and subsequent supplemental operations are often required to complete the recovery program.

Numerous efforts have been undertaken to reduce the interfacial tension between water and oil in water-flooding techniques to improve the efficiency thereof. For example, surfactants have been incorporated in the injected liquid to reduce interfacial tension. A wide variety of surface active agents have been employed, e.g., petroleum sulfonates (U.S. Pat. No. 3,468,377); ethylene oxide adducts of alkyl phenols (U.S. Pat. No. 3,553,130); etc.

Although increasing the efficiency of the water-flooding techniques, the use of surfactant containing fluids does not usually result in recovery of all of the oil contained in the formation in one recovery operation. Thus, liquids containing surface active agents lack the viscosity necessary to displace the oil as a flat or planar front. Thus, the surfactant solutions tend to "finger" through the oil, resulting in an incomplete recovery.

In an effort to increase the viscosity of the injected fluid, it has been proposed to substitute therefor the so-called "micellar dispersions". These generally take the form of a water-external dispersion or emulsion of a hydrocarbon, polymer, etc., formed with the aid of a surfactant. Supplemental recovery techniques based upon the use of micellar dispersions are more efficient than water-flooding operations utilizing aqueous solutions of surfactants; however, they are not without disadvantages. For example, the surfactants contained in the micellar dispersions are often adsorbed by the rock surfaces in the oil bearing formation thereby resulting in a breakdown of the emulsion as it advances through the formation.

It has been suggested to preliminarily inject into the reservoir a solution of a "sacrificial" surfactant which is adsorbed by the rock formation. This occupation of the available adsorption sites by the "sacrificial" surface active agent substantially eliminates the adsorption thereby of the surfactant in the micellar dispersion. Since the sacrificial surfactants employed heretofore are relatively inexpensive as compared to the cost of the surfactant in the micellar dispersion and inasmuch as they are highly adsorbed by rock formations in the reservoir, they greatly enhance the efficiency and cost-effectiveness of recovery operations.

It has been suggested to employ medium molecular weight sulfonated petroleum sulfonates as sacrificial agents for the high molecular weight petroleum sulfonates utilized in micellar dispersions. See Gale et al, Soc. Pet. Eng., Vol. 13, No. 4, p. 191 (1973). U.S. Pat. No. 4,006,779 discloses the use of lignosulfates as sacrificial agents.

It is an object of the present invention to provide a supplemental oil recovery method which utilizes a micellar dispersion and a sacrificial surfactant which surpasses in efficiency and cost-effectiveness those suggested and employed heretofore.

SUMMARY OF THE INVENTION

The above and other objects of the invention are achieved by providing an improvement in a method of recovering oil from a subterranean formation containing oil and having at least one injection well and at least one production well extending thereinto wherein a micellar dispersion containing a surfactant is injected via at least one of the injection wells into the subterranean formation in order to displace the oil contained therein to at least one of the production wells where it is produced; the improvement comprising:

prior to injecting the micellar dispersion, injecting into the subterranean formation via at least one of the injection wells a fluid containing, as a sacrificial agent for the surfactant and other components contained in the micellar dispersion and which is adsorbed by adsorptive sites within the subterranean formation, a soda-anthraquinone lignin.

Alternatively, the soda-anthraquinone lignin may be admixed with the micellar dispersion prior to the injection of the latter into the formation in a supplemental oil recovery operation.

DETAILED DESCRIPTION OF THE INVENTION

The present invention is predicated on the discovery that soda-anthraquinone lignins, which are less expensive than the surfactants commonly employed in micellar dispersions for which they are sacrified, are readily adsorbed by subterranean oil-bearing formations or matrices. It has been further discovered that the soda-anthraquinone lignins are preferentially adsorbed by the formations to the substantial exclusion of the surfactant and other components of conventional micellar dispersions, thereby enabling its use in admixture with the micellar dispersion itself as well as in a preliminary flood.

Notwithstanding whether it is used as a pre-flood agent or in admixture with the micellar dispersion, the soda-anthraquinone ligins are strongly adsorbed by the adsorption sites in the formation and substantially eliminate the subsequent adsorption of the surfactant or other components of the micellar dispersion by the thus occupied adsorption sites.

It will be understood by those skilled in the art that the improvement of the present invention is applicable to any supplemental oil recovery technique which involves the injection into a subterranean formation of a micellar dispersion, emulsion or microemulsion notwithstanding whether it is termed a secondary, tertiary or subsequent recovery operation. Moreover, the soda-anthraquinone lignins may be utilized as a sacrifical agent for any micellar dispersion surfactant with which it is compatible when admixed therewith or utilized as a preflush.

The quantity of soda-anthraquinone injected into the formation is not overly critical. However, in the interest of cost-effectiveness, it is preferable to utilize an amount sufficient to occupy substantially all of the surfactant adsorption sites in the oil-bearing formation matrix into which it is injected. The utilization of less than this optimum amount will result in the adsorption of at least a portion of the surfactant or other components of the injected micellar dispersion. The use of more than the optimum amount of soda-anthraquinone lignin will merely increase the overall cost of the recovery operation. The amount necessary to occupy all of the available sites in the formation will depend upon the size and nature of the formation and is easily ascertainable by those skilled in the art without undue experimentation having been exposed to the principles of the present invention.

It will be further understood by those skilled in the art that by the term "micellar dispersion" is meant any aqueous external emulsion, or dispersion of a hydrocarbon polymer or other viscosity increasing agent containing a surfactant intended for use in a supplemental oil recovery operation. Typical such viscosity increasing agents include polyacrylamides (Pusher ®700—Dow Chemical Co.), carboxymethylcelluose, xanthan gum (Kelzan ®—XC, Kelso, Inc.), hydroxyethylcellulose (Natrosol ®—Hercules, Inc.), etc.

Conventionally employed surfactants for forming the micellar dispersions include polyoxyethylene alkyl phenols, dodecyl diethylene glycol sulfonate, alkyl aryl sulfonates, sodium dodecyl benzene sulfonate, petroleum sulfonates, etc.

Typical micellar dispersions and oil recovery techniques employing same are described in U.S. Pat. Nos. 4,008,768; 4,008,769 and 3,964,548, the disclosures of which are incorporated herein by reference.

In a specific embodiment of this invention, a sacrificial material comprising a soda-anthraquinone lignin is injected via suitable injection means, i.e., through one or more injection wells completed in the subterranean hydrocarbon formation, so that the sacrificial material enters the formation ahead of the micellar dispersion. The dispersion is then injected into the subterranean hydrocarbon-containing formation followed by a slug of polymer solution and the injection water to drive it to the production well. The sacrificial material adsorbs onto and occupies the adsorptive sites existing in the matrix or the formation thereby eliminating or substantially decreasing the tendency for the subsequently injected surfactant and other components in the micellar dispersion to adsorb on the rock matrix.

In a broad embodiment of the invention, a sacrificial material is injected into a petroleum reservoir ahead of a micellar dispersion. In another embodiment the sacrificial agent is injected in admixture with the micellar dispersion into the petroleum formation. This micellar dispersion-sacrificial agent mixture may or may not be preceded by a slug of sacrificial material only.

In any of the above embodiments and others which are obvious to those skilled in the art the micellar dispersion (whether it contains sacrificial agent or not) may be followed by a material to taper the viscosity before drive water is injected. This technique, known well to those in the art, prevents the drive water from fingering into the more viscous micellar dispersion.

Soda-anthraquinone lignins and methods for their recovery are well known in the art. Typical of such methods are those described by Bozena Kosikova et al, Paperi Ja Pun, Vol. 62(4a), pp. 229–236 (1980); Irwin A. Pearl, *The Chemistry of Lignin*, Mariel Dekker, Inc., N.Y., N.Y., pp. 19–22 (1967) and Friedrich Emil Brauns, *The Chemistry of Lignin*, Academic Press, Inc., N.Y., N.Y., pp. 99 and 416 (1952), the disclosures of which are incorporated herein by reference. Briefly, a typical method comprises the acidification of black liquor from a soda-anthraquinone pulping operation to a pH of about 3. The precipitate is collected by vacuum filtration and given an aqueous wash, followed by a dioxane wash. The product soda-anthraquinone lignin is then dried under vacuum.

Although the concentration of the soda-anthraquinone lignin sacrificial solution is not overly critical, it is preferred to utilize a solution, whether it is a pre-flush or an admixture of the lignin with the micellar dispersion, having a concentration of from about 1% to about 5%, by weight, of soda-anthraquinone lignin. Those skilled in the art, having been exposed to the principles of the invention, will be able to determine optimal soda-anthraquinone lignin concentrations for a particular application without resorting to undue experimentation.

One major advantage associated with the use of soda-anthraquinone lignins as sacrifical agents as compared to lignosulfonates is that the sulfonation step required to prepare the latter is avoided.

More importantly, however, the soda-anthraquinone lignins are superior sacrificial agents to the lignosulfonates, as evidenced by the following non-limiting examples;

EXAMPLE 1

A glass chromatography column (300 mm×1×1 id) is filled with Ottawa sand 30 g. A known amount of oil (~10 g) is passed through the column and collected. The addition flask and the preweighed collection flask are reweighed to determine the amount of oil retained on the sand column. Next, aqueous brine (75 ml, 1%) is passed through the column and is collected. The brine is extracted with hexane. The hexane is dried and evaporated. The amount of oil recovered is determined. The amount of residual oil on the column is calculated. Then, a one percent solution of sacrificial agent (40 ml) is added to the column. The collected aqueous lignin is extracted with hexane. The hexane is dried and evaporated. The amount of oil recovered is determined. The percent recovery of oil is then calculated (Table I), using the following equation:

$$\% \text{ Recovery} = \frac{\text{g. oil recovered by 1\% lignin solution}}{\text{g. residual oil on column (after brine flush)}}$$

The results are set forth in Table I.

TABLE 1

| 1% Aqueous Solution of | % Oil Recovery | Standard Deviation |
| --- | --- | --- |
| Soda-AQ Lignin[1] | 25.8 | 12.3 |
| Marasperse N-22[2] | 9.6 | 1.7 |
| Lignosol DXD[3] | 10.0 | 7.2 |
| REAX 88-B[4] | 14.2 | 3.8 |
| Brine | 10.8 | 3.0 |

[1] soda-anthraquinone lignin
[2] sulfite (American Can)
[3] sulfite (Reed, Ltd.)
[4] sulfonated Kraft (Westvaco)

EXAMPLE 2

The procedure of Example 1 was followed except that the lignin solution was replaced by the following system: 42 g/l brine, 2% petroleum sulfonate surfactant (Petrostep 465, Stepan, Inc.), and 1% of a sulfonated oxyethylnonyl phenol surfactant (Atsurf 1910) (ICI Americas, Inc.). The procedure was repeated seven times resulting in an average of 54.8% oil recovery.

EXAMPLE 3

The procedure of Example 1 was repeated except that the lignin solution was replaced by the following system: 42 g/l brine, 2% Petrostep 465, 1% Atsurf 1910 and 1% soda-anthraquinone lignin. The results obtained from seven repetitions of the procedure showed an average of 59.2% oil recovery.

EXAMPLE 4

The procedure of Example 1 was repeated except that, following the flush of the column with the soda-anthraquinone lignin solution, the following system was added to the column; 42 g/l brine, 2% Petrostep 465 and 1T Atsurf 1910. The results from seven repetitions of the procedure revealed an average of 64.8% oil recovery.

I claim:
1. In a method for recovering oil from a subterranean formation containing oil and having at least one injection well and at least one production well wherein a micellar dispersion containing a surfactant is injected via said at least one injection well into said subterranean formation in order to displace the oil contained therein to said at least one production well wherein it is produced, the improvement comprising:
   prior to injecting said micellar dispersion, injecting into said subterranean formation via said at least one injection well a fluid containing soda-anthraquinone lignin which is adsorbed by adsorptive sites within said subterranean formation and functions as a sacrificial agent for the surfactant and other components contained in said micellar dispersion.
2. In a method for recovering oil from a subterranean formation containing oil and having at least one injection well and at least one production well wherein a micellar dispersion containing a surfactant is injected via said at least one injection well into said subterranean formation in order to displace the oil contained therein to said at least one production well wherein it is produced, the improvement comprising:
   injecting into said subterranean formation in admixture with said micellar dispersion a soda-anthraquinone lignin which is adsorbed by adsorptive sites within said subterranean formation and functions as a sacrificial agent for the surfactant and other components of said micellar dispersion.
3. A method according to claim 1 or 2 wherein the soda-anthraquinone lignin is present within said subterranean formation in an amount sufficient to occupy substantially all of said adsorptive sites on said rock.
4. A method according to claim 1 or 2 wherein said micellar dispersion is an aqueous-external dispersion of a hydrocarbon.

* * * * *